US010248010B2

(12) United States Patent
Liu

(10) Patent No.: US 10,248,010 B2
(45) Date of Patent: Apr. 2, 2019

(54) METHOD FOR ADJUSTING RELATIVE POSITION BETWEEN DEVICES AND ADJUSTMENT APPARATUS

(71) Applicant: BEIJING ZHIGU RUI TUO TECH CO., LTD., Beijing (CN)

(72) Inventor: Jia Liu, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 15/555,367

(22) PCT Filed: Mar. 4, 2016

(86) PCT No.: PCT/CN2016/075559
§ 371 (c)(1),
(2) Date: Sep. 1, 2017

(87) PCT Pub. No.: WO2016/141850
PCT Pub. Date: Sep. 15, 2016

(65) Prior Publication Data
US 2018/0039166 A1 Feb. 8, 2018

(30) Foreign Application Priority Data
Mar. 6, 2015 (CN) .......................... 2015 1 0098548

(51) Int. Cl.
G03B 21/14 (2006.01)
G03B 37/04 (2006.01)
(Continued)

(52) U.S. Cl.
CPC ........ G03B 21/145 (2013.01); F21V 33/0052 (2013.01); G03B 37/04 (2013.01);
(Continued)

(58) Field of Classification Search
CPC .. H04B 10/1149; H04B 10/116; G03B 21/145
See application file for complete search history.

(56) References Cited

U.S. PATENT DOCUMENTS

2011/0261522 A1   10/2011   Wang et al.
2013/0266327 A1   10/2013   Bae et al.
(Continued)

FOREIGN PATENT DOCUMENTS

CN   103645749   3/2014
CN   103796056   5/2014
(Continued)

OTHER PUBLICATIONS

International Search Report and Written Opinion for Application No. PCT/CN2016/075559, dated Jun. 3, 2016, 8 pages.

Primary Examiner — Dzung D Tran
(74) Attorney, Agent, or Firm — Sheppard, Mullin, Richter & Hampton LLP

(57) ABSTRACT

Embodiments of the present application provide a method for adjusting a relative position between devices and an adjustment apparatus. The method comprises: acquiring information associated with a first device's receiving of a reference signal transmitted by at least one signal source on at least one reference position of a second device, the at least one reference position being determined at least according to information associated with a relative position desired between the first device and the second device; and determining information associated with adjustment on the relative position between the first device and the second device at least according to the information associated with the first device's receiving of the reference signal transmitted on the at least one reference position. The method and apparatus of the embodiments of the present application can, from the perspective of devices to interact, transmit a reference signal according to a desired relative position, can assist in better (Continued)

adjusting relative position between devices according to receiving of the reference signal, and are easy to implement.

56 Claims, 10 Drawing Sheets

(51) Int. Cl.
*F21V 33/00* (2006.01)
*G06F 1/16* (2006.01)
*G06F 3/01* (2006.01)
*G06F 3/03* (2006.01)
*H04B 10/112* (2013.01)

(52) U.S. Cl.
CPC ............ *G06F 1/1616* (2013.01); *G06F 3/017* (2013.01); *G06F 3/0304* (2013.01); *H04B 10/112* (2013.01)

(56) References Cited

U.S. PATENT DOCUMENTS

| | | | | |
|---|---|---|---|---|
| 2014/0068513 | A1* | 3/2014 | Sakagawa | A61B 3/102 |
| | | | | 715/810 |
| 2014/0132936 | A1 | 5/2014 | Zheng et al. | |
| 2015/0057787 | A1* | 2/2015 | Muraki | G01N 15/1434 |
| | | | | 700/166 |
| 2015/0160348 | A1* | 6/2015 | Zweigle | G09B 29/004 |
| | | | | 356/607 |
| 2016/0035310 | A1 | 2/2016 | Song et al. | |
| 2017/0287085 | A1* | 10/2017 | Smith | H04W 4/023 |

FOREIGN PATENT DOCUMENTS

| | | |
|---|---|---|
| CN | 103809354 | 5/2014 |
| CN | 104238923 A | 12/2014 |

* cited by examiner

METHOD FOR ADJUSTING RELATIVE POSITION BETWEEN DEVICES AND ADJUSTMENT APPARATUS

CROSS-REFERENCE TO RELATED APPLICATIONS

The application is a National Phase Application of International Application No. PCT/CN2016/075559, filed on Mar. 4, 2016, which claims priority to and benefit of Chinese Patent Application No. 201510098548.9 filed with the Chinese Patent Office on Mar. 6, 2015 and entitled "METHOD FOR ADJUSTING RELATIVE POSITION BETWEEN DEVICES AND ADJUSTING APPARATUS". Both of the above-referenced applications are incorporated into the present application by reference in their entirety.

TECHNICAL FIELD

Embodiments of the present application relate to the field of technologies of interaction between devices, and in particular, to a method for adjusting a relative position between devices and an adjustment apparatus.

BACKGROUND

With progress of technologies and gradual maturity of the market, the number of smart devices that people own is constantly increasing, and the number of smart devices co-existing in environments is also constantly increasing. The smart devices may include mobile devices, wearable devices, smart home devices, and so on. Correspondingly, a scenario where multiple devices participate in people's daily life and work. For example, while watching TV, people shoot scenes presented on the TV that they want to record; during shooting, in order to achieve a better shooting effect, at least two shoot devices are used. In the scenario where multiple devices participate, a demand inevitably exists that the multiple devices can achieve a better cooperative effect, interaction between the devices can change more gradually and better meet the demand, and relative positions between the devices may affect interaction effects between the devices.

SUMMARY

In view of this, One example, of no-limiting objective of each embodiment of the present application is to provide a scheme that can help to better adjust relative positions between devices.

To achieve the foregoing objective, in a first aspect, the embodiments of the present application provide a method for adjusting relative positions between devices, the method comprising:

acquiring information associated with a first device's receiving of a reference signal transmitted by at least one signal source on at least one reference position of a second device, the at least one reference position being determined at least according to information associated with a relative position desired between the first device and the second device; and determining information associated with adjustment on the relative position between the first device and the second device at least according to the information associated with the first device's receiving of the reference signal transmitted on the at least one reference position.

In a second aspect, the embodiments of the present application provide a method for adjusting relative positions between devices, the method comprising:

acquiring information associated with a first device's receiving of a reference signal transmitted by at least one signal source on at least one reference position of a second device, the at least one reference position being determined at least according to information associated with a relative position desired between the first device and the second device; and adjusting the relative position between the first device and the second device at least according to the information associated with the first device's receiving of the reference signal transmitted on the at least one reference position.

In a third aspect, the embodiments of the present application provide a method for adjusting relative positions between devices, the method comprising:

acquiring information associated with a first device's receiving of a reference signal transmitted by at least one signal source on at least one reference position of a second device, the at least one reference position being determined at least according to information associated with a relative position desired between the first device and the second device; and prompting adjusting the relative position between the first device and the second device at least according to the information associated with the first device's receiving of the reference signal transmitted on the at least one reference position.

In a fourth aspect, the embodiments of the present application provide an apparatus for adjusting relative positions between devices, the apparatus comprising:

a first acquisition module, configured to acquire information associated with a first device's receiving of a reference signal transmitted by at least one signal source on at least one reference position of a second device, the at least one reference position being determined at least according to information associated with a relative position desired between the first device and the second device; and a first determination module, configured to determine information associated with adjustment on the relative position between the first device and the second device at least according to the information associated with the first device's receiving of the reference signal transmitted on the at least one reference position.

In a fifth aspect, the embodiments of the present application provide an apparatus for adjusting relative positions between devices, the apparatus comprising:

a third acquisition module, configured to acquire information associated with a first device's receiving of a reference signal transmitted by at least one signal source on at least one reference position of a second device, the at least one reference position being determined at least according to information associated with a relative position desired between the first device and the second device; and an adjustment module, configured to adjust the relative position between the first device and the second device at least according to the information associated with the first device's receiving of the reference signal transmitted on the at least one reference position.

In a sixth aspect, the embodiments of the present application provide an apparatus for adjusting relative positions between devices, the apparatus comprising:

a sixth acquisition module, configured to acquire information associated with a first device's receiving of a reference signal transmitted by at least one signal source on at least one reference position of a second device, the at least one reference position being determined at least according to information associated with a relative position desired between the first device and the second device; and a prompt module, configured to prompt adjusting the relative position between the first device and the second device at least according to the information associated with the first device's receiving of the reference signal transmitted on the at least one reference position.

In a seventh aspect, the embodiments of the present application provide a computer readable storage device, comprising at least one executable instruction, which, in response to execution, causes a system comprising a processor to perform operations, comprising:

acquiring information associated with a first device's receiving of a reference signal transmitted by at least one signal source on at least one reference position of a second device, the at least one reference position being determined at least according to information associated with a relative position desired between the first device and the second device; and determining information associated with adjustment on the relative position between the first device and the second device at least according to the information associated with the first device's receiving of the reference signal transmitted on the at least one reference position.

In an eighth aspect, the embodiments of the present application provide a device for adjusting relative positions between devices comprising a processor and memory, wherein the memory storing a computer executable instruction, the processor being connected with the memory via a communication bus, and when the device is operating, the processor executes or facilitates execution of the executable instructions stored by the memory to perform:

acquiring information associated with a first device's receiving of a reference signal transmitted by at least one signal source on at least one reference position of a second device, the at least one reference position being determined at least according to information associated with a relative position desired between the first device and the second device; and determining information associated with adjustment on the relative position between the first device and the second device at least according to the information associated with the first device's receiving of the reference signal transmitted on the at least one reference position.

In a ninth aspect, the embodiments of the present application provide a computer readable storage device, comprising at least one executable instruction, which, in response to execution, causes a system comprising a processor to perform operations, comprising:

acquiring information associated with a first device's receiving of a reference signal transmitted by at least one signal source on at least one reference position of a second device, the at least one reference position being determined at least according to information associated with a relative position desired between the first device and the second device; and adjusting the relative position between the first device and the second device at least according to the information associated with the first device's receiving of the reference signal transmitted on the at least one reference position.

In a tenth aspect, the embodiments of the present application provide a device for adjusting relative positions between devices comprising a processor and memory, wherein the memory storing computer executable instructions, the processor being connected with the memory via a communication bus, and when the device is operating, the processor executes or facilitates execution of the executable instructions stored by the memory:

acquiring information associated with a first device's receiving of a reference signal transmitted by at least one signal source on at least one reference position of a second device, the at least one reference position being determined at least according to information associated with a relative position desired between the first device and the second device; and adjusting the relative position between the first device and the second device at least according to the information associated with the first device's receiving of the reference signal transmitted on the at least one reference position.

In an eleventh aspect, the embodiments of the present application provide a computer readable storage device, comprising at least one executable instruction, which, in response to execution, causes a system comprising a processor to perform operations, comprising:

acquiring information associated with a first device's receiving of a reference signal transmitted by at least one signal source on at least one reference position of a second device, the at least one reference position being determined at least according to information associated with a relative position desired between the first device and the second device; and prompting to adjust the relative position between the first device and the second device at least according to the information associated with the first device's receiving of the reference signal transmitted on the at least one reference position.

In a twelfth aspect, the embodiments of the present application provide a device for adjusting relative positions between devices comprising a processor and memory, wherein the memory storing computer executable instructions, the processor being connected with the memory via a communication bus, and when the device is operating, the processor executes or facilitates execution of the executable instructions stored by the memory:

acquiring information associated with a first device's receiving of a reference signal transmitted by at least one signal source on at least one reference position of a second device, the at least one reference position being determined at least according to information associated with a relative position desired between the first device and the second device; and prompting to adjust the relative position between the first device and the second device at least according to the information associated with the first device's receiving of the reference signal transmitted on the at least one reference position The methods and apparatuses of the embodiments of the present application can, from the perspective of devices to interact, transmit a reference signal according to a desired relative position, can assist in better adjusting a relative position between devices according to receiving of the reference signal, and are easy to implement.

DETAILED DESCRIPTION

Specific implementations of the present application are further described in detail hereinafter with reference to the accompanying drawings and embodiments. The following embodiments are intended to describe the present application, but not to limit the scope of the present application.

Those skilled in the art should understand that the terms such as "first" and "second" in the present application are merely used to distinguish different devices, modules or parameters or the like, which neither represent any specific technical meanings nor represent a necessary logic sequence therebetween.

In addition, in the embodiments of the present application, according to demands of application scenarios, the first device and the second device may be any devices configured to be used in various application scenarios in work and life automatically or under the control of users. Such devices may be, for example, TVs, mobile phones, tablet computers, PCs, smart glasses, video cameras, cameras, smartbands, on-board smart devices, and so on. In the embodiments of the present application, the first device and the second device may be similar devices, first and second are used to clearly distinguish that they are different sides during interaction, and in various application scenarios, one first device may interact with multiple second devices; similarly, one second device may also interact with multiple first devices.

Figure 1:
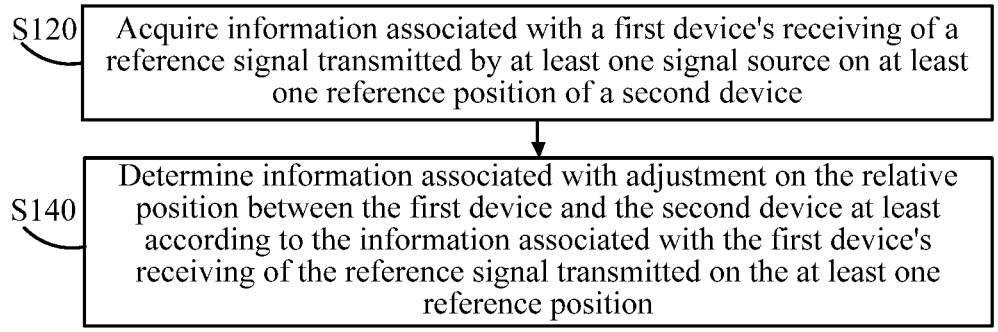
FIG. 1 is an example flowchart of an example of a method for adjusting relative positions between devices according to a first embodiment of the present application.

FIG. 1 is a flowchart of an example of a method for adjusting relative positions between devices according to a first embodiment of the present application. The method may be performed by an apparatus which belongs to any first device or second device, or performed by an apparatus independent of any first device and any second device. As shown in FIG. 1, the method comprises:

S120. Acquire information associated with a first device's receiving of a reference signal transmitted by at least one signal source on at least one reference position of a second device, the at least one reference position being determined at least according to information associated with a relative position desired between the first device and the second device.

As the purpose of the method of each embodiment of the present application is to assist in adjusting the relative position between the first device and the second device, it is more direct and accurate to determine information associated with adjustment on the relative position from the perspective of the first device and the second device. The information associated with adjustment on the relative position may comprise, but is not limited to, whether adjustment is necessary, how to make adjustment, what is adjusted, and so on. In particular, the at least one reference position where the at least one signal source transmits the reference signal is located on the second device, whether the at least one signal source belongs to the second device, the reference signal can be considered to be transmitted from the second device, and by controlling the at least one signal source to transmit the reference signal on the at least one reference position of the second device, a current relative position relationship between the first device and the second device can be inferred according to the first device's receiving of the reference signal. In the method of each embodiment of the present application, the at least one reference position is relevant to the relative position desired between the first device and the second device. In other words, the reference signal transmitted on the at least one reference position is transmitted for the relative position desired between the first device and the second device, instead of being transmitted for the specific second device, that is, the reference signal transmitted on the at least one reference position is transmitted for the position where interaction can be better completed and the first device should be. For example, suppose that a desired position where ideal interaction with the second device can be performed is a first position or within a region range, at least one reference position at the second device is determined accordingly, to enable a reference signal transmitted on the at least one reference position by the at least one signal source to be received by a device at the first position or within the region range, or the reference signal, which is received by the device at the first position or within the region range, transmitted on the at least one reference position should meet a certain condition (for example, a received signal has desired signal strength, or a strength difference between at least two reference signals received is within a certain range, and in order to distinguish reference signals transmitted on different reference positions, the reference signals transmitted on the reference positions may comprise identification information of the corresponding reference positions). That is, the at least one reference position is determined at least according to information associated with a relative position desired between the first device and the second device. In order to determine the first device's receiving of such reference signals, in step S120, information associated with a first device's receiving of a reference signal transmitted by at least one signal source on at least one reference position of a second device is acquired. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

S140. Determine information associated with adjustment on the relative position between the first device and the second device at least according to the information associated with the first device's receiving of the reference signal transmitted on the at least one reference position.

As stated above, the relative position between the first device and the second device can be inferred according to the first device's receiving of the reference signal, so as to determine the information associated with adjustment on the relative position between the first device and the second device, for example, whether adjustment is necessary, how to make adjustment, what is adjusted, and so on.

To sum up, the method of this embodiment, from the perspective of devices to interact, transmits a reference signal according to a desired relative position, can assist in better adjusting a relative position between devices according to receiving of the reference signal, and is easy to implement.

The at least one signal source may belong to an execution apparatus of the method of this embodiment, or belong to the second device, or be an independent signal source. The signal source may be a Visible Light Communication (VLC) light source, and correspondingly, the reference signal comprises a visible light signal. In order to achieve the purpose of the method of this embodiment, the method may further comprise:

S112. Control the at least one signal source to transmit the reference signal on the at least one reference position of the second device at least according to the information associated with the relative position desired between the first device and the second device.

In addition, the relative position desired between the first device and the second device may be manually set by a user according to different application scenarios, or may be determined by the first device and/or the second device according to their current positions and different application scenarios. According to different execution apparatus of the method of this embodiment, the method of this embodiment may further comprise:

S114. Acquire the information associated with the relative position desired between the first device and the second device.

For example, it is feasible to acquire information associated with the relative position desired between the first device and the second device from the first device, from the second device or in a manner of acquiring a user instruction. In the method of this embodiment, the information associated with the relative position desired between the first device and the second device may comprise, but is not limited to, a distance desired between the first device and the second device, a relative orientation desired between the first device and the second device, and so on.

S116. Determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In one possible implementation, in order to make a device (e.g., the first device and/or the second device) that performs adjustment on the relative position between the first device and/or the second device know whether and/or how to adjust a current position, the method of this embodiment may further comprise:

S130. Send information associated with an adjustment rule of the relative position; for example, it is feasible to send the information to the first device and/or the second device.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, it is feasible to module the signal onto the visible light signal for sending, and correspondingly, the method of the embodiment further comprises a modulation step prior to transmission of the reference signal.

In addition, if the execution apparatus of the method of this embodiment is independent of the first device, step S120 may comprise:

S122. Receive the information associated with the first device's receiving of the reference signal transmitted by the at least one signal source on the at least one reference position of the second device; for example, receive the information, from the first device, associated with the first device's receiving of the reference signal transmitted by the at least one signal source on the at least one reference position of the second device.

When the execution apparatus of the method of this embodiment is independent of the first device and the first device is required to adjust its current position, this embodiment may further comprise:

S162. Generate a control command that controls the first device to adjust a current position at least according to the information associated with adjustment on the relative position between the first device and the second device.

S164. Send the control command; for example, it is feasible to send the control command to the first device.

When the execution apparatus of the method of this embodiment is independent of the second device and the second device is required to adjust its current position, this embodiment may further comprise:

S162'. Generate a control command that controls the second device to adjust a current position at least according to the information associated with adjustment on the relative position between the first device and the second device.

S164'. Send the control command; for example, it is feasible to send the control command to the second device.

When the execution apparatus of the method of this embodiment is independent of the first device and the second device and the first device and the second device are required to adjust their current positions, this embodiment may further comprise:

S162″. Generate a control command that controls the first device and the second device to adjust their current positions respectively at least according to the information associated with adjustment on the relative position between the first device and the second device.

S164″. Send the control command; for example, it is feasible to send the control command to the first device and the second device respectively.

In another possible implementation, in order to improve user experience, it is feasible that a user selects whether to adjust the current positions/current position of the first device and/or the second device.

When the execution apparatus of the method of this embodiment is independent of the first device and the first device is required to adjust its current position, the method of this embodiment may further comprise:

S182. Generate prompt information that prompts adjusting a current position of the first device at least according to the information associated with adjustment on the relative position between the first device and the second device.

S184. Send the prompt information; for example, it is feasible to send the prompt information to the first device.

When the execution apparatus of the method of this embodiment is independent of the second device and the second device is required to adjust its current position, the method of this embodiment may further comprise:

S182′. Generate prompt information that prompts adjusting a current position of the second device at least according to the information associated with adjustment on the relative position between the first device and the second device.

S184′. Send the prompt information; for example, it is feasible to send the prompt information to the second device.

When the execution apparatus of the method of this embodiment is independent of the first device and the second device and the first device and the second device are required to adjust their current positions, the method of this embodiment may further comprise:

S182″. Generate prompt information that prompts adjusting a current position of the first device and the second device at least according to the information associated with adjustment on the relative position between the first device and the second device.

S184″. Send the prompt information; for example, it is feasible to send the prompt information to the first device and the second device respectively.

To sum up, the method of this embodiment can assist in achieving adjustment on the relative positions between devices in a simple way, and has good user experience.

Figure 2:
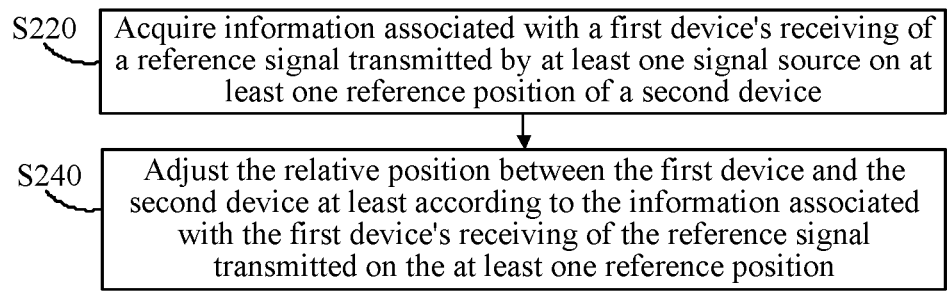
FIG. 2 is an example flowchart of an example of a method for adjusting relative positions between devices according to a second embodiment of the present application.

FIG. 2 is a flowchart of an example of a method for adjusting relative positions between devices according to a second embodiment of the present application. The method may also be performed by an apparatus which belongs to any first device or second device, or performed by an apparatus independent of any first device and any second device. As shown in FIG. 2, the method comprises:

S220. Acquire information associated with a first device's receiving of a reference signal transmitted by at least one signal source on at least one reference position of a second device, the at least one reference position being determined at least according to information associated with a relative position desired between the first device and the second device.

In combination with the description of the method of the first embodiment, in order to determine a first device's receiving of a reference signal transmitted on at least one reference position of a second device by at least one signal source, in step S220, information associated with a first device's receiving of a reference signal transmitted by at least one signal source on at least one reference position of a second device is acquired. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

S240. Adjust the relative position between the first device and the second device at least according to the information associated with the first device's receiving of the reference signal transmitted on the at least one reference position.

As stated above, the relative position between the first device and the second device can be inferred according to the first device's receiving of the reference signal, so as to adjust information associated with the relative position between the first device and the second device.

To sum up, the method of this embodiment, from the perspective of devices to interact, transmits a reference signal according to a desired relative position, can better adjust a relative position between devices according to receiving of the reference signal, and is easy to implement.

The at least one signal source may belong to an execution apparatus of the method of this embodiment, or belong to the second device, or be an independent signal source. The signal source may be a VLC light source, and correspondingly, the reference signal comprises a visible light signal. In order to achieve the purpose of the method of this embodiment, the method may further comprise:

S212. Control the at least one signal source to transmit the reference signal on the at least one reference position of the second device at least according to the information associated with the relative position desired between the first device and the second device.

In addition, the relative position desired between the first device and the second device may be manually set by a user according to different application scenarios, or may be determined by the first device and/or the second device according to their current positions and different application scenarios. According to different execution apparatus of the method of this embodiment, the method of this embodiment may further comprise:

S214. Acquire the information associated with the relative position desired between the first device and the second device.

For example, it is feasible to acquire information associated with the relative position desired between the first device and the second device from the first device, from the second device or in a manner of acquiring a user instruction. In the method of this embodiment, the information associated with the relative position desired between the first device and the second device may comprise, but is not limited to, a distance desired between the first device and the second device, a relative orientation desired between the first device and the second device, and so on.

S216. Determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In addition, if the execution apparatus of the method of this embodiment is independent of the first device, step S220 may comprise:

S222. Receive the information associated with the first device's receiving of the reference signal transmitted by the at least one signal source on the at least one reference position of the second device; for example, receive the information, from the first device, associated with the first device's receiving of the reference signal transmitted by the at least one signal source on the at least one reference position of the second device.

In addition, step S240 may comprise:

S242. Adjust a current position of the first device. Alternatively, S244. Adjust a current position of the second device. Alternatively, S246. Adjust current positions of the first device and the second device respectively.

In order to know whether and/or how to adjust the relative position between the first device and/or the second device, the method of this embodiment may further comprise:

S230. Acquire information associated with an adjustment rule of the relative position.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, the information is modulated onto the visible light signal. In step S230, it is feasible to acquire the information associated with the adjustment rule of the relative position in a manner of demodulating the reference signal. In step S240, it is feasible to make adjustment at least according to the adjustment rule acquired in step S230.

To sum up, the method of this embodiment can achieve adjustment on the relative positions between devices in a simple way.

Figure 3:
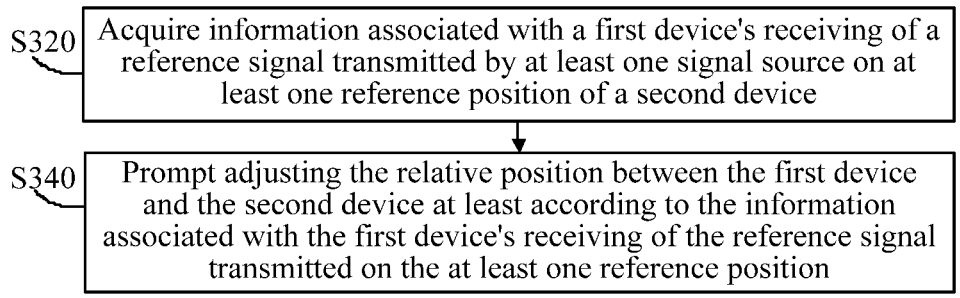
FIG. 3 is an example flowchart of an example of a method for adjusting relative positions between devices according to a third embodiment of the present application.

FIG. 3 is a flowchart of an example of a method for adjusting relative positions between devices according to a third embodiment of the present application. The method may also be performed by an apparatus which belongs to any first device or second device, or performed by an apparatus independent of any first device and any second device. As shown in FIG. 3, the method comprises:

S320. Acquire information associated with a first device's receiving of a reference signal transmitted by at least one signal source on at least one reference position of a second device, the at least one reference position being determined at least according to information associated with a relative position desired between the first device and the second device.

In combination with the description of the method of the first embodiment, in order to determine a first device's receiving of a reference signal transmitted on at least one reference position of a second device by at least one signal source, in step S220, information associated with a first device's receiving of a reference signal transmitted by at least one signal source on at least one reference position of a second device is acquired. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

S340. Prompt adjusting the relative position between the first device and the second device at least according to the information associated with the first device's receiving of the reference signal transmitted on the at least one reference position.

As stated above, the relative position between the first device and the second device can be inferred according to the first device's receiving of the reference signal, so as to prompt a user to adjust the relative position between the first device and the second device.

To sum up, the method of this embodiment, from the perspective of devices to interact, transmits a reference signal according to a desired relative position, can assist in better adjusting a relative position between devices according to receiving of the reference signal, and is easy to implement.

The at least one signal source may belong to an execution apparatus of the method of this embodiment, or belong to the second device, or be an independent signal source. The signal source may be a VLC light source, and correspondingly, the reference signal comprises a visible light signal. In order to achieve the purpose of the method of this embodiment, the method may further comprise:

S312. Control the at least one signal source to transmit the reference signal on the at least one reference position of the second device at least according to the information associated with the relative position desired between the first device and the second device.

In addition, the relative position desired between the first device and the second device may be manually set by a user according to different application scenarios, or may be determined by the first device and/or the second device according to their current positions and different application scenarios. According to different execution bodies of the method of this embodiment, the method of this embodiment may further comprise:

S314. Acquire the information associated with the relative position desired between the first device and the second device.

For example, it is feasible to acquire information associated with the relative position desired between the first device and the second device from the first device, from the second device or in a manner of acquiring a user instruction. In the method of this embodiment, the information associated with the relative position desired between the first device and the second device may comprise, but is not limited to, a distance desired between the first device and the second device, a relative orientation desired between the first device and the second device, and so on.

S316. Determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In addition, if the execution apparatus of the method of this embodiment is independent of the first device, step S320 may comprise:

S322. Receive the information associated with the first device's receiving of the reference signal transmitted by the at least one signal source on the at least one reference position of the second device.

In addition, step S340 may comprise:

S342. Prompt adjusting a current position of the first device. Alternatively, S344. Prompt adjusting a current position of the second device. Alternatively, S346. Prompt adjusting current positions of the first device and the second device respectively.

In addition, in order to prompt a user how to adjust the relative position between the first device and the second device, the method of this embodiment may further comprise:

S330. Acquire information associated with an adjustment rule of the relative position.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, the information is modulated onto the visible light signal. In step S330, it is feasible to acquire the information associated with the adjustment rule of the relative position in a manner of demodulating the reference signal. In step S340, it is feasible to make prompt at least according to the adjustment rule acquired in step S330.

To sum up, the method of this embodiment can assist in achieving adjustment on the relative positions between devices in a simple way, and has good user experience.

It should be understood by those skilled in the art that, in the methods of the specific implementations of the present application, the value of the serial number of each step described below does not mean an execution sequence, and the execution sequence of each step should be determined according to the function and internal logic thereof, and should not be any limitation to the implementation procedure of the specific implementations of the present application.

In addition, the embodiments of the present application further provide a computer readable storage medium, comprising computer readable instructions that, when executed by a computer, cause the computer to perform the steps of the method in the implementation shown in FIG. 1 and described in the specification in connection with FIG. 1.

In addition, the embodiments of the present application further provide a computer readable storage medium, comprising computer readable instructions that, when executed by a computer, cause the computer to perform the steps of the method in the implementation shown in FIG. 2 and described in the specification in connection with FIG. 2.

In addition, the embodiments of the present application further provide a computer readable storage medium, comprising computer readable instructions that, when executed by a computer, cause the computer to perform the steps of the method in the implementation shown in FIG. 3 and described in the specification in connection with FIG. 3.

Figure 4A:
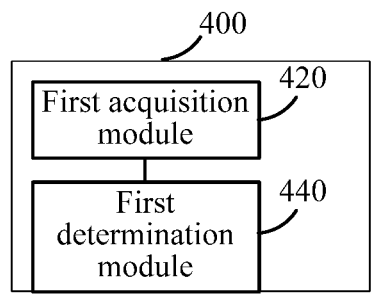
FIG. 4(a)-FIG. 4(g) are example structural block diagrams of several examples of an apparatus for adjusting relative positions between devices according to the first embodiment of the present application.
Figure 4B:
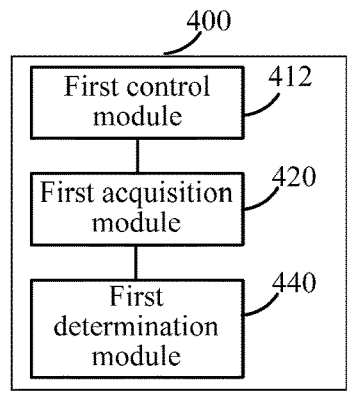
Figure 4C:
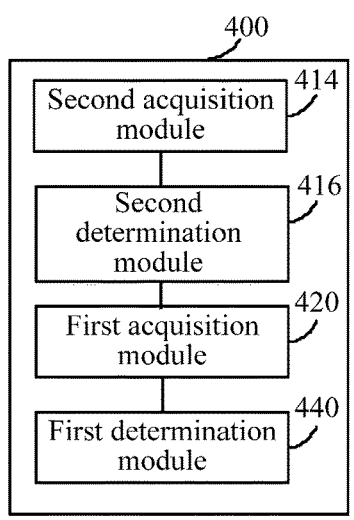
Figure 4D:
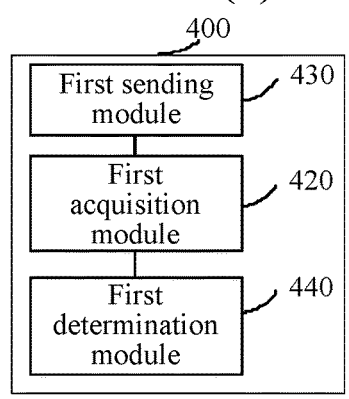

FIG. 4(a) is a structural block diagram of an example of an apparatus for adjusting relative positions between devices according to the first embodiment of the present application. The apparatus 400 may belong to any first device or second device, or be an apparatus independent of any first device or second device, and in addition to various components described below, the apparatus may also comprise a communication module that implements communication with any device outside the apparatus according to needs. As shown in FIG. 4(a), the apparatus 400 comprises a first acquisition module 420 and a first determination module 440.

The first acquisition module 420 may be configured to acquire information associated with a first device's receiving of a reference signal transmitted by at least one signal source on at least one reference position of a second device, the at least one reference position being determined at least according to information associated with a relative position desired between the first device and the second device.

As the purpose of the apparatus of each embodiment of the present application is to assist in adjusting the relative position between the first device and the second device, it is more direct and accurate to determine information associated with adjustment on the relative position from the perspective of the first device and the second device. The information associated with adjustment on the relative position may comprise, but is not limited to, whether adjustment is necessary, how to make adjustment, what is adjusted, and so on. In particular, the at least one reference position where the at least one signal source transmits the reference signal is located on the second device, whether the at least one signal source belongs to the second device, the reference signal can be considered to be transmitted from the second device, and by controlling the at least one signal source to transmit the reference signal on the at least one reference position of the second device, a current relative position relationship between the first device and the second device can be inferred according to the first device's receiving of the reference signal. In the method of each embodiment of the present application, the at least one reference position is relevant to the relative position desired between the first device and the second device, in other words, the reference signal transmitted on the at least one reference position is transmitted for the relative position desired between the first device and the second device, instead of being transmitted for the specific second device, that is, the reference signal transmitted on the at least one reference position is transmitted for the position where interaction can be better completed and the first device should be. For example, suppose that a desired position where ideal interaction with the second device can be performed is a first position or within a region range, at least one reference position at the second device is determined accordingly, to enable a reference signal transmitted on the at least one reference position by the at least one signal source to be received by a device at the first position or within the region range, or the reference signal, which is received by the device at the first position or within the region range, transmitted on the at least one reference position should meet a certain condition (for example, a received signal has a desired signal strength, or a strength difference between at least two reference signals received is within a certain range, and in order to distinguish reference signals transmitted on different reference positions, the reference signals transmitted on the reference positions may comprise identification information of the corresponding reference positions). That is, the at least one reference position is determined at least according to information associated with a relative position desired between the first device and the second device. In order to determine the first device's receiving of such reference signals, the first acquisition module 420 acquires information associated with a first device's receiving of a reference signal transmitted by at least one signal source on at least one reference position of a second device. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

The first determination module 440 may be configured to determine information associated with adjustment on the relative position between the first device and the second device at least according to the information associated with the first device's receiving of the reference signal transmitted on the at least one reference position.

As stated above, the first determination module 440 can infer the relative position between the first device and the second device according to the first device's receiving of the reference signal, so as to determine the information associated with adjustment on the relative position between the first device and the second device, for example, whether adjustment is necessary, how to make adjustment, what is adjusted, and so on.

To sum up, the apparatus of this embodiment, from the perspective of devices to interact, transmits a reference signal according to a desired relative position, can assist in better adjusting a relative position between devices according to receiving of the reference signal, and is easy to implement.

The at least one signal source may belong to the apparatus of this embodiment, or belong to the second device, or be an independent signal source. The signal source may be a VLC light source, and correspondingly, the reference signal comprises a visible light signal. In order to achieve the purpose of the apparatus of this embodiment, as shown in FIG. 4(*b*), the apparatus 400 may further comprise a first control module 412 configured to control the at least one signal source to transmit the reference signal on the at least one reference position of the second device at least according to the information associated with the relative position desired between the first device and the second device.

In addition, the relative position desired between the first device and the second device may be manually set by a user according to different application scenarios, or may be determined by the first device and/or the second device according to their current positions and different application scenarios. According to different roles of the apparatus of this embodiment, as shown in FIG. 4(*c*), the apparatus 400 of this embodiment may further comprise:

A second acquisition module 414, configured to acquire the information associated with the relative position desired between the first device and the second device.

The second acquisition module 414 can, for example, acquire information associated with the relative position desired between the first device and the second device from the first device, from the second device or in a manner of acquiring a user instruction. In the apparatus of this embodiment, the information associated with the relative position desired between the first device and the second device may comprise, but is not limited to, a distance desired between the first device and the second device, a relative orientation desired between the first device and the second device, and so on.

A second determination module 416, configured to determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In order to make a device (e.g., the first device and/or the second device) that performs adjustment on the relative position between the first device and/or the second device know whether and/or how to adjust a current position, in one possible implementation, as shown in FIG. 4(*d*), the apparatus 400 of this embodiment may further comprise:

A first sending module 430, configured to send information associated with an adjustment rule of the relative position; for example, the information can be sent to the first device and/or the second device.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, it is feasible to module the signal in the visible light signal for sending.

Figure 4E:
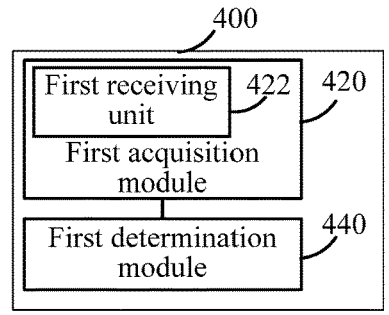

In addition, if the apparatus of this embodiment is independent of the first device, as shown in FIG. 4(e), the first acquisition module 420 may comprise:

A first receiving unit 422, configured to receive the information associated with the first device's receiving of the reference signal transmitted by the at least one signal source on the at least one reference position of the second device; the first receiving unit 422 may, for example, receive the information, from the first device, associated with the first device's receiving of the reference signal transmitted by the at least one signal source on the at least one reference position of the second device.

Figure 4F:
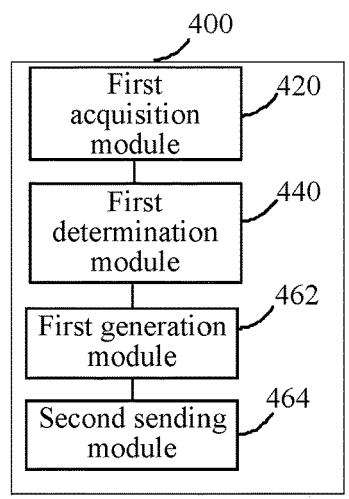

In one possible implementation, as shown in FIG. 4(f), the apparatus of this embodiment may further comprise: a first generation module 462 and a second sending module 464.

The first generation module 462 is configured to, when the apparatus of this embodiment is independent of the first device and the first device is required to adjust its current position, generate a control command that controls the first device to adjust a current position at least according to the information associated with adjustment on the relative position between the first device and the second device; when the apparatus of this embodiment is independent of the second device and the second device is required to adjust its current position, generate a control command that controls the second device to adjust a current position; and when the apparatus of this embodiment is independent of the first device and the second device and the first device and the second device are required to adjust their current positions, generate a control command that controls the first device and the second device to adjust their current positions respectively.

The second sending module 464 is configured to send the control command, for example, the second sending module 464 may send the control command to the first device, send the control command to the second device, or send the control command to the first device and the second device respectively.

Figure 4G:
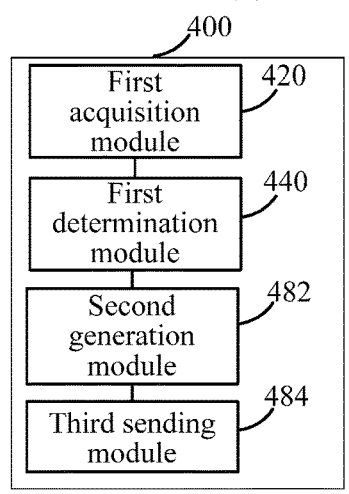

In another possible implementation, in order to improve user experience, it is feasible that a user selects whether to adjust the current positions/current position of the first device and/or the second device. As shown in FIG. 4(g), in such an implementation, the apparatus 400 of this embodiment may further comprise: a second generation module 482 and a third sending module 484.

The second generation module 482 is configured to, when the apparatus of this embodiment is independent of the first device and the first device is required to adjust its current position, generate prompt information that prompts adjusting a current position of the first device at least according to the information associated with adjustment on the relative position between the first device and the second device; or when the apparatus of this embodiment is independent of the second device and the second device is required to adjust its current position, generate prompt information that prompts adjusting a current position of the second device; or when the apparatus of this embodiment is independent of the first device and the second device and the first device and the second device are required to adjust their current positions, generate prompt information that prompts adjusting current positions of the first device and the second device.

The third sending module 484 is configured to send the prompt information; for example, the third sending module 484 may send the prompt information to the first device, or send the prompt information to the second device, or send the prompt information to the first device and the second device respectively.

To sum up, the apparatus of this embodiment can assist in achieving adjustment on the relative positions between devices in a simple way, and has good user experience.

Figure 5A:
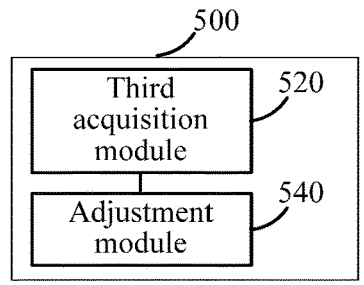
FIG. 5(a)-FIG. 5(e) are example structural block diagrams of several examples of an apparatus for adjusting relative positions between devices according to the second embodiment of the present application.

FIG. 5(a) is a structural block diagram of an example of an apparatus for adjusting relative positions between devices according to the second embodiment of the present application. The apparatus 500 may also belong to any first device or second device, or be an apparatus independent of any first device and any second device. As shown in FIG. 5(a), the apparatus 500 comprises a third acquisition module 520 and an adjustment module 540.

The third acquisition module 520 may be configured to acquire information associated with a first device's receiving of a reference signal transmitted by at least one signal source on at least one reference position of a second device, the at least one reference position being determined at least according to information associated with a relative position desired between the first device and the second device.

In combination with the description of the apparatus of the first embodiment, in order to determine a first device's receiving of a reference signal transmitted on at least one reference position of a second device by at least one signal source, the third acquisition module 520 acquires information associated with a first device's receiving of a reference signal transmitted by at least one signal source on at least one reference position of a second device. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

The adjustment module 540 may be configured to adjust the relative position between the first device and the second device at least according to the information associated with the first device's receiving of the reference signal transmitted on the at least one reference position.

As stated above, the adjustment module 540 can infer the relative position between the first device and the second device according to the first device's receiving of the reference signal, so as to adjust information associated with the relative position between the first device and the second device.

To sum up, the apparatus of this embodiment, from the perspective of devices to interact, transmits a reference signal according to a desired relative position, can better adjust a relative position between devices according to receiving of the reference signal, and is easy to implement.

Figure 5B:
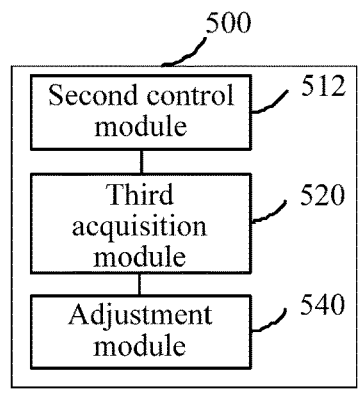

The at least one signal source may belong to the apparatus of this embodiment, or belong to the second device, or be an independent signal source. The signal source may be a VLC light source, and correspondingly, the reference signal comprises a visible light signal. In order to achieve the purpose of the apparatus of this embodiment, as shown in FIG. 5(b), the apparatus 500 may further comprise a second control module 512 configured to control the at least one signal source to transmit the reference signal on the at least one reference position of the second device at least according to the information associated with the relative position desired between the first device and the second device.

Figure 5C:
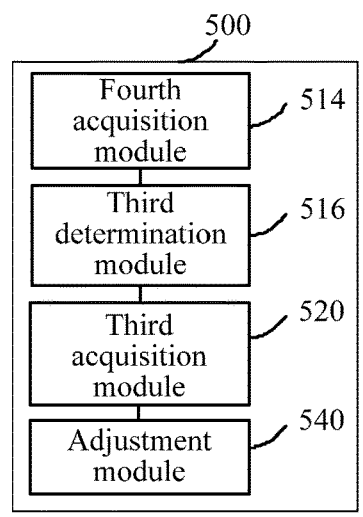

In addition, the relative position desired between the first device and the second device may be manually set by a user according to different application scenarios, or may be determined by the first device and/or the second device according to their current positions and different application scenarios. According to different roles of the apparatus of this embodiment, as shown in FIG. 5(c), the apparatus 500 of this embodiment may further comprise:

A fourth acquisition module 514, configured to acquire the information associated with the relative position desired between the first device and the second device.

The fourth acquisition module 514 may, for example, acquire information associated with the relative position desired between the first device and the second device from the first device, from the second device or in a manner of acquiring a user instruction. In the apparatus of this embodiment, the information associated with the relative position desired between the first device and the second device may comprise, but is not limited to, a distance desired between the first device and the second device, a relative orientation desired between the first device and the second device, and so on.

Figure 5D:
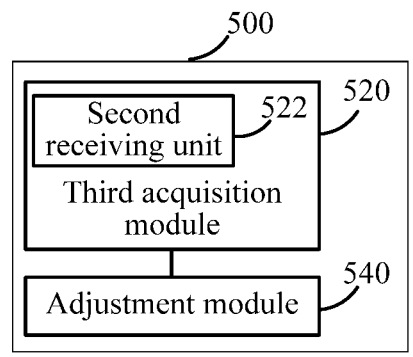

In order to achieve the purpose of the apparatus of this embodiment, in one possible implementation, as shown in FIG. 5(d), the apparatus 500 may further comprise:

A third determination module 516, configured to determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In addition, if the apparatus of this embodiment is independent of the first device, as shown in FIG. 5(d), the third acquisition module 520 may comprise:

A second receiving unit 522, configured to receive the information associated with the first device's receiving of the reference signal transmitted by the at least one signal source on the at least one reference position of the second device; for example, the second receiving unit 522 receives the information, from the first device, associated with the first device's receiving of the reference signal transmitted by the at least one signal source on the at least one reference position of the second device.

In addition, the adjustment module 540, according to needs, is configured to adjust a current position of the first device, or adjust a current position of the second device, or adjust current positions of the first device and the second device respectively.

Figure 5E:
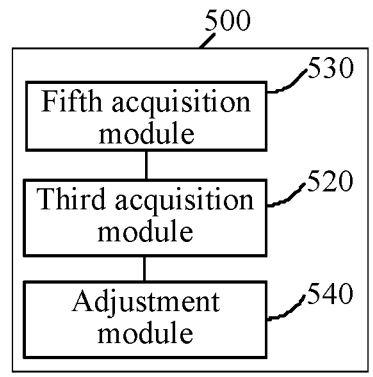

In order to know whether and/or how to adjust a current position, in one possible implementation, as shown in FIG. 5(e), the apparatus 500 of this embodiment may further comprise:

A fifth acquisition module 530, configured to acquire information associated with an adjustment rule of the relative position.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, the information is modulated onto the visible light signal. Correspondingly, the fifth acquisition module 530 may acquire the information associated with the adjustment rule of the relative position in a manner of demodulating the reference signal. The adjustment module 540 may make adjustment at least according to the adjustment rule acquired by the fifth acquisition module 530.

To sum up, the apparatus of this embodiment can achieve adjustment on the relative positions between devices in a simple way.

Figure 6A:
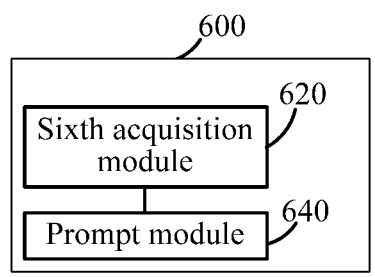
FIG. 6(a)-FIG. 6(e) are example structural block diagrams of several examples of an apparatus for adjusting relative positions between devices according to the third embodiment of the present application.
Figure 6B:
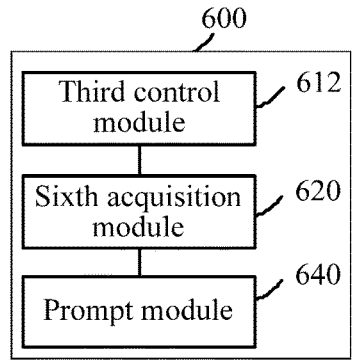
Figure 6C:
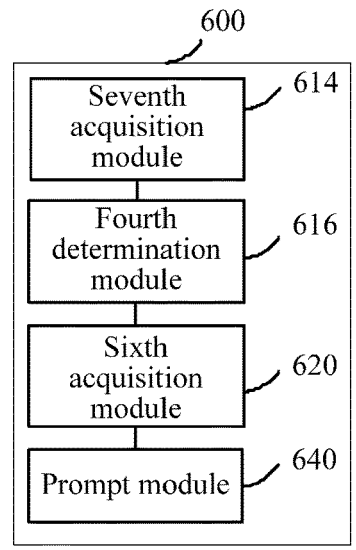
Figure 6D:
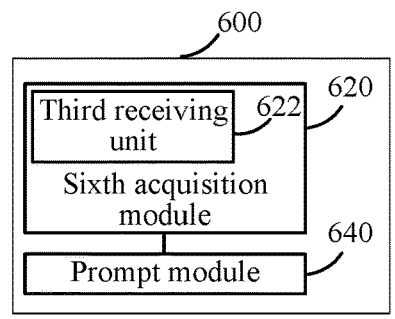
Figure 6E:
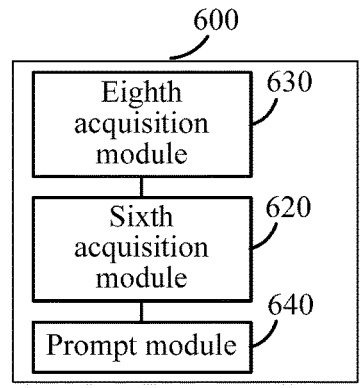

FIG. 6(a) is a structural block diagram of an example of an apparatus for adjusting relative positions between devices according to the third embodiment of the present application. The apparatus 600 may also belong to any first device or second device, or be an apparatus independent of any first device and any second device. As shown in FIG. 6(a), the apparatus 600 comprises a sixth acquisition module 620 and a prompt module 640.

The sixth acquisition module 620 may be configured to acquire information associated with a first device's receiving of a reference signal transmitted by at least one signal source on at least one reference position of a second device, the at least one reference position being determined at least according to information associated with a relative position desired between the first device and the second device.

In combination with the description of the apparatus of the first embodiment, in order to determine a first device's receiving of a reference signal transmitted on at least one reference position of a second device by at least one signal source, the sixth acquisition module 620 acquires information associated with a first device's receiving of a reference signal transmitted by at least one signal source on at least one reference position of a second device. The information associated with the first device's receiving of the reference signal transmitted by the at least one signal source on the at least one reference position of the second device may comprise, but is not limited to: whether the first device has received the reference signal transmitted on the at least one reference position; how the strength of at least two reference signals, which are received by the first device, transmitted on the at least one reference position is; and strength differences between reference signals, which are received by the first device, transmitted on the at least one reference position.

The prompt module 640 may be configured to prompt adjusting the relative position between the first device and the second device at least according to the information associated with the first device's receiving of the reference signal transmitted on the at least one reference position.

As stated above, the prompt module 640 can infer the relative position between the first device and the second device according to the first device's receiving of the reference signal, so as to prompt a user to adjust the relative position between the first device and the second device.

To sum up, the apparatus of this embodiment, from the perspective of devices to interact, transmits a reference signal according to a desired relative position, can assist in better adjusting a relative position between devices according to receiving of the reference signal, and is easy to implement.

The at least one signal source may belong to the apparatus of this embodiment, or belong to the second device, or be an independent signal source. The signal source may be a VLC light source, and correspondingly, the reference signal comprises a visible light signal. In order to achieve the purpose of the apparatus of this embodiment, as shown in FIG. 6(*b*), the apparatus 600 may further comprise:

A third control module 612, configured to control the at least one signal source to transmit the reference signal on the at least one reference position of the second device at least according to the information associated with the relative position desired between the first device and the second device.

In addition, the relative position desired between the first device and the second device may be manually set by a user according to different application scenarios, or may be determined by the first device and/or the second device according to their current positions and different application scenarios. According to different roles of the apparatus of this embodiment, as shown in FIG. 6(*c*), the apparatus 600 of this embodiment may further comprise:

A seventh acquisition module 614, configured to acquire the information associated with the relative position desired between the first device and the second device.

The seventh acquisition module 614 may, for example, acquire information associated with the relative position desired between the first device and the second device from the first device, from the second device or in a manner of acquiring a user instruction. In the apparatus of this embodiment, the information associated with the relative position desired between the first device and the second device may comprise, but is not limited to, a distance desired between the first device and the second device, a relative orientation desired between the first device and the second device, and so on.

A fourth determination module 616, configured to determine the at least one reference position at least according to the information associated with the relative position desired between the first device and the second device, so as to enable the reference signal transmitted on the at least one reference position to be received by a device at a position or within a region range associated with the desired relative position, or the reference signal, which is received by a device at a position or within a region range associated with the desired relative position, transmitted on the at least one reference position should meet a certain condition.

In addition, if the apparatus of this embodiment is independent of the first device, as shown in FIG. 6(*d*), the sixth acquisition module 620 may comprise:

A third receiving unit 622, configured to receive the information associated with the first device's receiving of the reference signal transmitted by the at least one signal source on the at least one reference position of the second device.

In addition, the prompt module 640, according to needs, may be configured to prompt adjusting a current position of the first device, or prompt adjusting a current position of the second device, or prompt adjusting current positions of the first device and the second device respectively.

In addition, in order to prompt a user how to adjust the relative position between the first device and the second device, in one possible implementation, as shown in FIG. 6(*e*), the apparatus 600 of this embodiment may further comprise:

An eighth acquisition module 630, configured to acquire information associated with an adjustment rule of the relative position.

The information associated with the adjustment rule of the relative position is information that can indicate how the current position should be adjusted according to the first device's receiving of the reference signal transmitted by the at least one signal source on the at least one reference position of the second device. The adjustment rule is, for example, if the first device can receive a first reference signal sent on a first reference position but does not receive a second reference signal sent on a second reference position, the first device should move to a first direction, and/or the second device should move to a second direction opposite the first direction; if strength of the first reference signal received by the first device is greater than that of the second reference signal received, the first device should move to the first direction, and/or the second device should move to the second direction opposite the first direction. The adjustment amplitude may be properly set according to needs.

In one possible implementation, it is feasible to carry the information associated with the adjustment rule of the relative position in the reference signal to be sent together. For example, in an implementation where the reference signal is a visible light signal, the information is modulated onto the visible light signal. Correspondingly, the eighth acquisition module 630 may acquire the information associated with the adjustment rule of the relative position in a manner of demodulating the reference signal. The prompt module 640 may make prompt at least according to the adjustment rule acquired by the eighth acquisition module 630.

To sum up, the apparatus of this embodiment can assist in achieving adjustment on the relative positions between devices in a simple way, and has good user experience.

The methods and apparatuses of the embodiments of the present application are further described below through specific examples.

Example 1

Figure 7A:
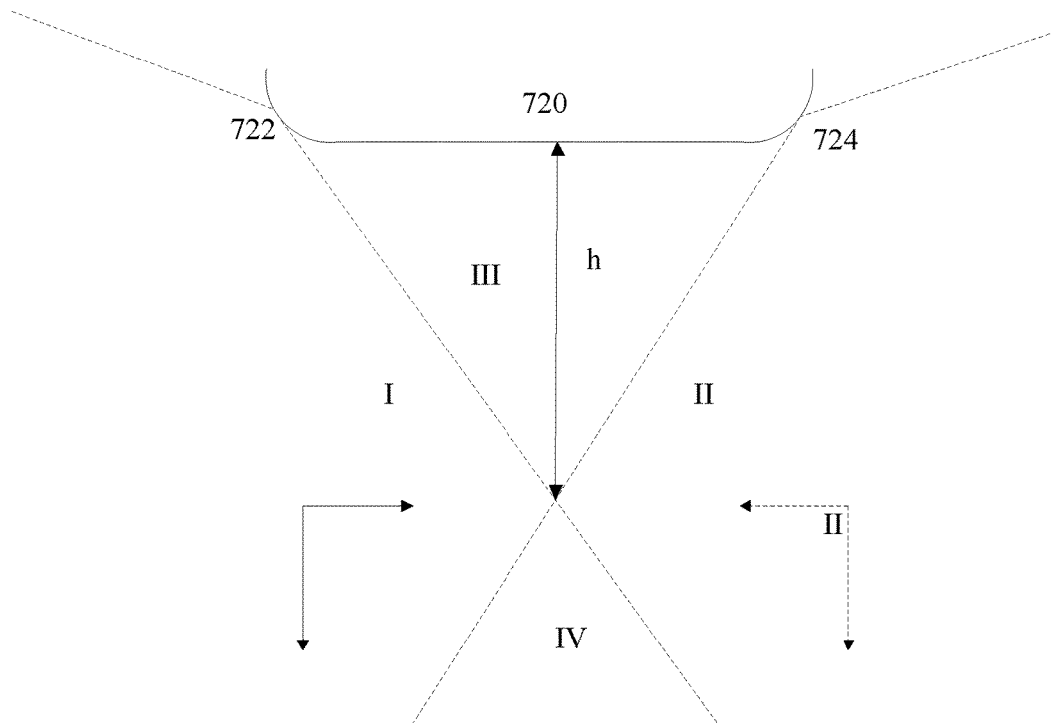
FIG. 7(a)-FIG. 7(b) are example schematic diagrams of application scenarios of two examples.
Figure 7B:
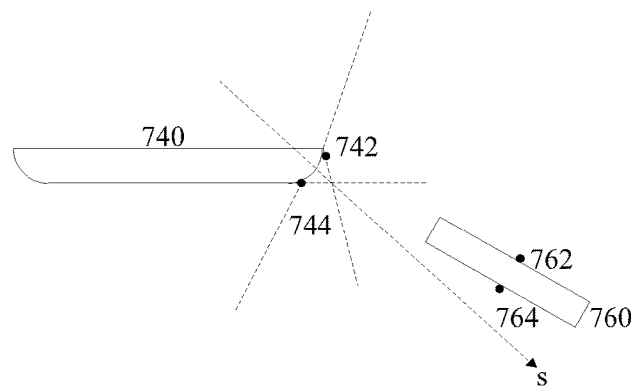

This example is a scenario where a user wears smart glasses to watch TV. As shown in FIG. 7(*a*), two sides of the glasses 720 are provided with a first light source 722 and a second light source 724, a best viewing distance (that is, the desired distance between the first device and the second device as described above) is not less than h. For example, as shown in the figure, when the location of the user can cause the TV to be located in a region IV of the user's field of vision, it is the best viewing distance. Suppose that the apparatus for adjusting relative positions between devices according to the first embodiment of the present application belongs to or be the smart glasses 720, in accordance with the method of the embodiment of the present application, an interaction process between the smart glasses 720 and the TV is as follows:

The first light source 722 and the second light source 724 can send a visible light signal respectively, and the visible light signal comprises identification information of the two light sources; the TV's receiving of the visible light signals sent by the two light sources is acquired through communication with the TV; if the TV can only receive the visible light signal from the first light source 722, the user is prompted to move to a direction indicated by the solid arrow in the figure, so as to adjust a relative position between the smart glasses and the TV; if the TV can only receive the visible light signal from the second light source 724, the user is prompted to move to a direction indicated by dotted lines in the figure, so as to adjust a relative position between the smart glasses and the TV; when the TV is located in a region III, such a relative position will cause the TV to receive no reference signal.

In the same scenario, suppose that the apparatus for adjusting relative positions between devices according to the first embodiment of the present application belongs to or be the smart glasses 720, in accordance with the method of the embodiment of the present application, an interaction process between the smart glasses 720 and the TV is as follows:

It is determined that two side edges of the smart glasses are reference positions, if the TV can only receive the visible light signal from the first light source 722, it is possible to generate prompt information that prompts the user to move to a direction indicated by the solid arrow in the figure or to automatically adjust the position of the TV, so as to adjust a relative position between the smart glasses and the TV; if the TV can only receive the visible light signal from the second light source 724, it is possible to generate prompt information that prompts the user to move to a direction indicated by dotted lines in the figure or to automatically adjust the position of the TV, so as to adjust a relative position between the smart glasses and the TV; when the TV is located in a region III, such a relative position will cause the TV to receive no reference signal.

Example 2

As shown in FIG. 7(*b*), this example is a scenario where a user uses a device 740 and a device 760 to take pictures. Shoot ranges of the device 740 and the device 760 are limited, and in order to shoot a target region more entirely, it is feasible to use the two devices to shoot some regions and then stitch shoot results for implementation. According to requirements for effects of image stitching, it is desired that the device 760 is located in a direction indicated by a solid arrow S. In this example, the device 760 has a front photosensitive element (e.g., a camera) 762 and a rear photosensitive element 764, accordingly, it can be determined that a light source 742 and a light source 744 symmetrically distributed on two sides of the desired direction are utilized to transmit reference signals, and according to the degree of receiving the reference signals by the device 760, it is feasible to adjust the device 760 to a position where strength of the reference signals received from the light source 742 and the light source 744 is substantially identical.

Figure 8:
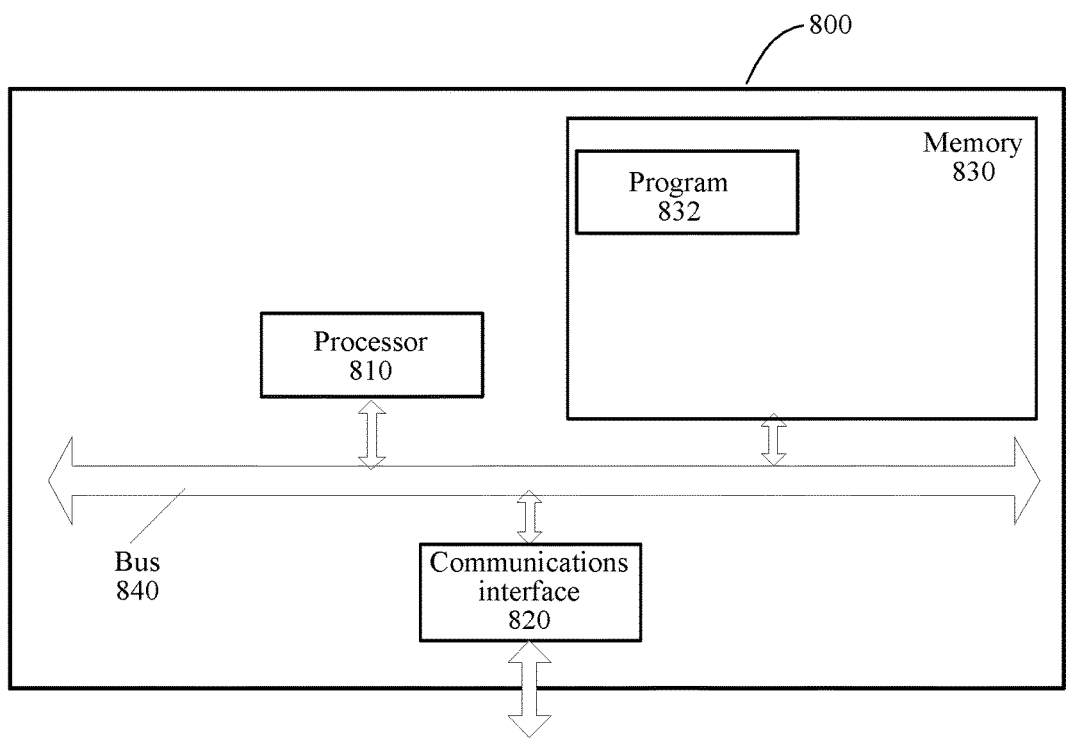
FIG. 8 is an example structural block diagram of another example of an apparatus for adjusting relative positions between devices according to the first embodiment of the present application.

FIG. 8 is a structural block diagram of another example of an apparatus for adjusting relative positions between devices according to the first embodiment of the present application; the specific embodiment of the present application does not limit specific implementation of the apparatus for adjusting relative positions between devices. As shown in FIG. 8, the apparatus 800 for adjusting relative positions between devices may comprise:

a processor 810, a Communications Interface 820, a memory 830, and a communications bus 840.

The processor 810, the Communications Interface 820, and the memory 830 accomplish mutual communications via the communications bus 840.

The Communications Interface 820 is configured to communicate with network elements such as clients.

The processor 810 is configured to execute a program 832, and specifically, can implement relevant functions of the apparatus for adjusting relative positions between devices in the apparatus embodiment shown in FIG. 4(*a*).

For example, the program 832 may comprise program codes, the program codes comprising computer operation instructions.

The processor 810 may be a central processing unit (CPU), or an application specific integrated circuit (ASIC), or be configured to be one or more integrated circuits which implement the embodiments of the present application. The program 832 can be specifically configured to cause the apparatus 800 for adjusting relative positions between devices to perform the following steps:

acquiring information associated with a first device's receiving of a reference signal transmitted by at least one signal source on at least one reference position of a second device, the at least one reference position being determined at least according to information associated with a relative position expected between the first device and the second device; and determining information associated with adjustment on the relative position between the first device and the second device at least according to the information associated with the first device's receiving of the reference signal transmitted on the at least one reference position.

Reference can be made to corresponding description in the corresponding steps and units in the embodiments for specific implementation of the steps in the program 832, which is not repeated herein. Those skilled in the art can clearly understand that, reference can be made to the corresponding process description in the method embodiments for the specific working procedures of the devices and the modules described above, and will not be repeated herein in order to make the description convenient and concise.

Figure 9:
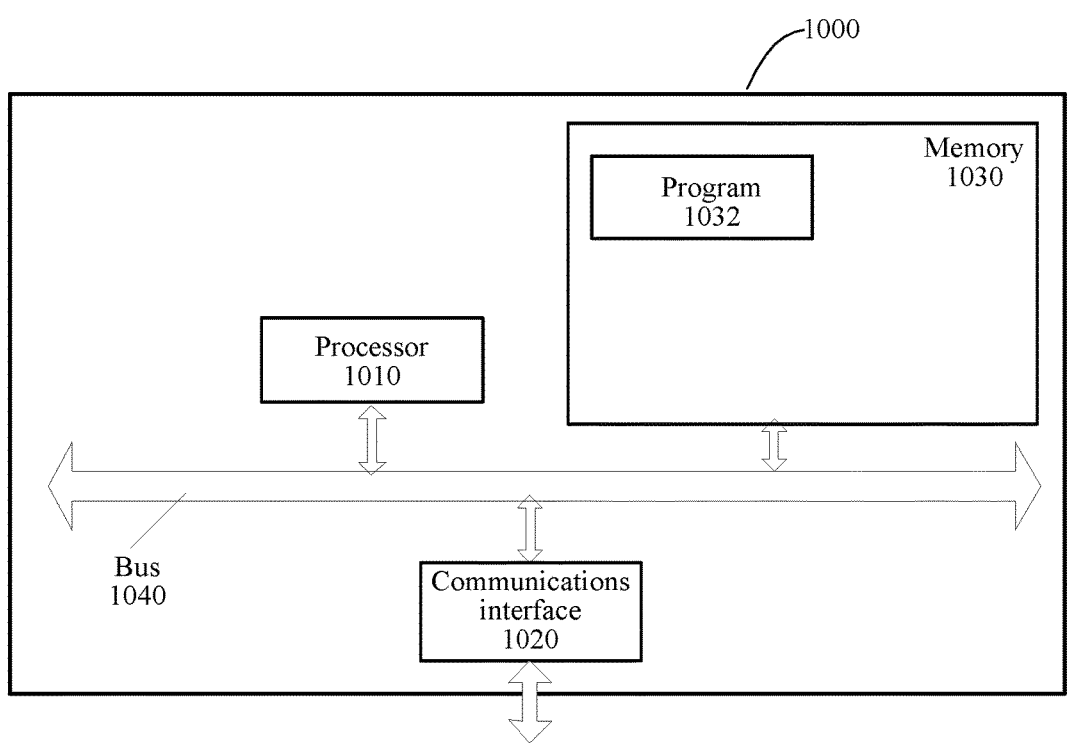
FIG. 9 is an example structural block diagram of another example of an apparatus for adjusting relative positions between devices according to the second embodiment of the present application.

FIG. 9 is a structural block diagram of another example of an apparatus for adjusting relative positions between devices according to the second embodiment of the present application; the specific embodiment of the present application does not limit specific implementation of the apparatus for adjusting relative positions between devices. As shown in FIG. 9, the apparatus 900 for adjusting relative positions between devices may comprise:

a processor 910, a Communications Interface 920, a memory 930, and a communications bus 940.

The processor 910, the Communications Interface 920, and the memory 930 accomplish mutual communications via the communications bus 940.

The Communications Interface 920 is configured to communicate with network elements such as clients.

The processor 910 is configured to execute a program 932, and specifically, can implement relevant functions of the transmission control apparatus in the apparatus embodiment shown in FIG. 5(*a*).

For example, the program 932 may comprise program codes, the program codes comprising computer operation instructions.

The processor 910 may be a central processing unit (CPU), or an application specific integrated circuit (ASIC), or be configured to be one or more integrated circuits which implement the embodiments of the present application. The program 932 can be specifically configured to cause the apparatus 900 for adjusting relative positions between devices to perform the following steps:

acquiring information associated with a first device's receiving of a reference signal transmitted by at least one signal source on at least one reference position of a second device, the at least one reference position being determined at least according to information associated with a relative position expected between the first device and the second device; and adjusting the relative position between the first device and the second device at least according to the information associated with the first device's receiving of the reference signal transmitted on the at least one reference position.

Reference can be made to corresponding description in the corresponding steps and units in the embodiments for specific implementation of the steps in the program 932, which is not repeated herein. Those skilled in the art can clearly understand that, reference can be made to the corresponding process description in the method embodiments for the specific working procedures of the devices and the modules described above, and will not be repeated herein in order to make the description convenient and concise.

Figure 10:
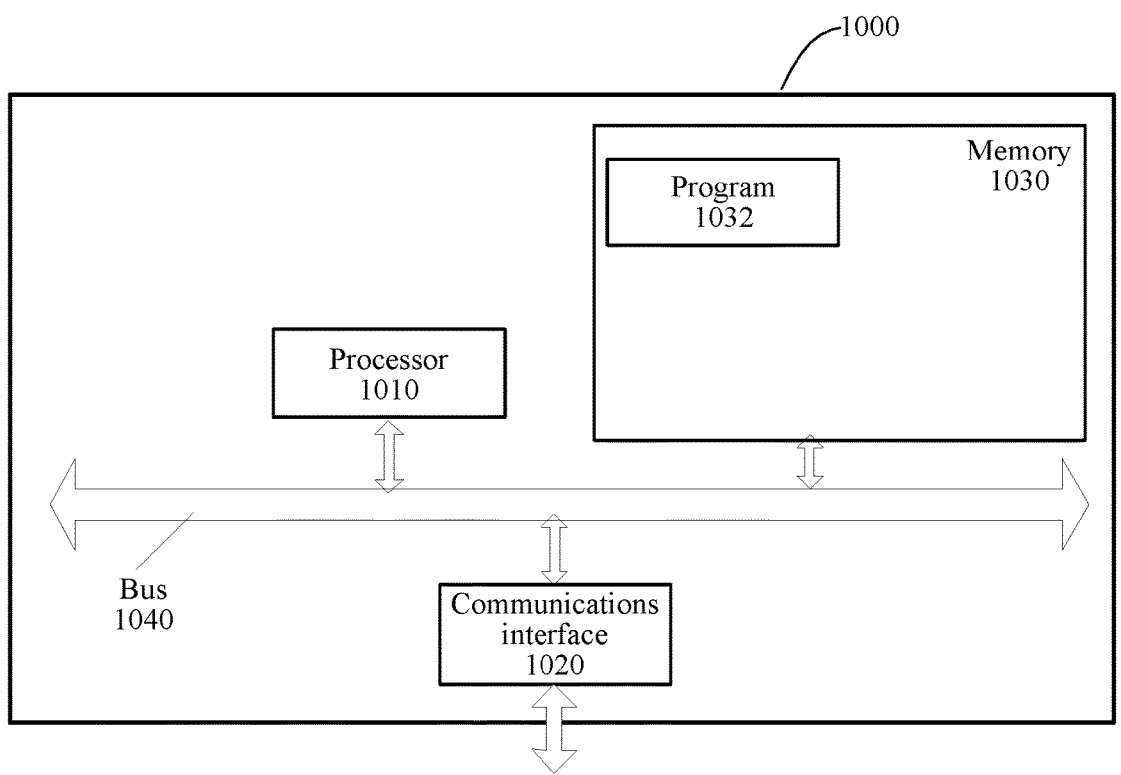
FIG. 10 is an example structural block diagram of another example of an apparatus for adjusting relative positions between devices according to the third embodiment of the present application.

FIG. 10 is a structural block diagram of another example of an apparatus for adjusting relative positions between devices according to the third embodiment of the present application; the specific embodiment of the present application does not limit specific implementation of the apparatus for adjusting relative positions between devices. As shown in FIG. 10, the apparatus 1000 for adjusting relative positions between devices may comprise:

a processor 1010, a Communications Interface 1020, a memory 1030, and a communications bus 1040.

The processor 1010, the Communications Interface 1020, and the memory 1030 accomplish mutual communications via the communications bus 1040.

The Communications Interface 1020 is configured to communicate with network elements such as clients.

The processor 1010 is configured to execute a program 1032, and specifically, can implement relevant functions of the apparatus for adjusting relative positions between devices in the apparatus embodiment shown in FIG. 6(*a*).

For example, the program 1032 may comprise program codes, the program codes comprising computer operation instructions.

The processor 1010 may be a central processing unit (CPU), or an application specific integrated circuit (ASIC), or be configured to be one or more integrated circuits which implement the embodiments of the present application. The program 1032 can be specifically configured to cause the apparatus 1000 for adjusting relative positions between devices to perform the following steps:

acquiring information associated with a first device's receiving of a reference signal transmitted by at least one signal source on at least one reference position of a second device, the at least one reference position being determined at least according to information associated with a relative position expected between the first device and the second device; and prompting adjusting the relative position between the first device and the second device at least according to the information associated with the first device's receiving of the reference signal transmitted on the at least one reference position.

Reference can be made to corresponding description in the corresponding steps and units in the embodiments for specific implementation of the steps in the program 1032, which is not repeated herein. Those skilled in the art can clearly understand that, reference can be made to the corresponding process description in the method embodiments for the specific working procedures of the devices and the modules described above, and will not be repeated herein in order to make the description convenient and concise.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

The above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method for adjusting relative positions between devices, the method comprising:
    acquiring information associated with a first device's receiving of a reference signal transmitted by at least one signal source on at least one reference position of a second device, the at least one reference position being determined at least according to information associated with a relative position desired between the first device and the second device; and
    determining information associated with adjustment on the relative position between the first device and the second device at least according to the information associated with the first device's receiving of the reference signal transmitted on the at least one reference position.

2. The method of claim 1, wherein the method further comprises:
controlling the at least one signal source to transmit the reference signal on the at least one reference position of the second device at least according to the information associated with the relative position desired between the first device and the second device.

3. The method of claim 2, wherein the method further comprises:
acquiring the information associated with the relative position desired between the first device and the second device; and
determining the at least one reference position at least according to the information associated with the relative position desired between the first device and the second device.

4. The method of claim 1, wherein the method further comprises:
sending information associated with an adjustment rule of the relative position.

5. The method of claim 4, wherein the reference signal transmitted on the at least one reference position comprises the information associated with the adjustment rule of the relative position.

6. The method of claim 1, wherein the information associated with the relative position desired between the first device and the second device comprises at least one of the following:
a distance desired between the first device and the second device, and a relative orientation desired between the first device and the second device.

7. The method of claim 1, wherein the acquiring information associated with a first device's receiving of a reference signal transmitted by at least one signal source on at least one reference position of a second device comprises:
receiving the information associated with the first device's receiving of the reference signal transmitted by the at least one signal source on the at least one reference position of the second device.

8. The method of claim 1, wherein the information associated with the first device's receiving of the reference signal transmitted by the at least one signal source on the at least one reference position of the second device comprises at least one of the following:
whether the first device has received the reference signal transmitted on the at least one reference position, strength of the reference signal, which the first device has received, transmitted on the at least one reference position, and a strength difference between at least two reference signals, which the first device has received, transmitted on the at least one reference position.

9. The method of claim 1, wherein the method further comprises:
generating a control command that controls at least one of the first device and the second device to adjust a current position at least according to the information associated with adjustment on the relative position between the first device and the second device; and
sending the control command.

10. The method of claim 1, wherein the method further comprises:
generating prompt information that prompts adjusting a current position of at least one of the first device and the second device at least according to the information associated with adjustment on the relative position between the first device and the second device; and
sending the prompt information.

11. The method of claim 1, wherein the reference signal comprises:
a visible light signal.

12. A method for adjusting relative positions between devices, the method comprising:
acquiring information associated with a first device's receiving of a reference signal transmitted by at least one signal source on at least one reference position of a second device, the at least one reference position being determined at least according to information associated with a relative position desired between the first device and the second device; and
adjusting the relative position between the first device and the second device at least according to the information associated with the first device's receiving of the reference signal transmitted on the at least one reference position.

13. The method of claim 12, wherein the method further comprises:
controlling the at least one signal source to transmit the reference signal on the at least one reference position of the second device at least according to the information associated with the relative position desired between the first device and the second device.

14. The method of claim 13, wherein the method further comprises:
acquiring the information associated with the relative position desired between the first device and the second device; and
determining the at least one reference position at least according to the information associated with the relative position desired between the first device and the second device.

15. The method of claim 12, wherein the information associated with the relative position desired between the first device and the second device comprises at least one of the following:
a distance desired between the first device and the second device, and a relative orientation desired between the first device and the second device.

16. The method of claim 12, wherein the acquiring information associated with a first device's receiving of a reference signal transmitted by at least one signal source on at least one reference position of a second device comprises:
receiving the information associated with the first device's receiving of the reference signal transmitted by the at least one signal source on the at least one reference position of the second device.

17. The method of claim 12, wherein the information associated with the first device's receiving of the reference signal transmitted by the at least one signal source on the at least one reference position of the second device comprises at least one of the following:
whether the first device has received the reference signal transmitted on the at least one reference position, strength of the reference signal, which the first device has received, transmitted on the at least one reference position, and a strength difference between at least two reference signals, which the first device has received, transmitted on the at least one reference position.

18. The method of claim 12, wherein the adjusting the relative position between the first device and the second device comprises:

adjusting current position of at least one of the first device and the second device.

19. The method of claim 18, wherein the method further comprises:
acquiring information associated with an adjustment rule of the relative position; and
in the adjusting a current position of at least one of the first device and the second device, adjusting the current position of at least one of the first device and the second device at least according to the information associated with the adjustment rule of the relative position.

20. The method of claim 19, wherein the reference signal transmitted on the at least one reference position comprises the information associated with the adjustment rule of the relative position.

21. The method of claim 12, wherein the reference signal comprises:
a visible light signal.

22. A method for adjusting relative positions between devices, the method comprising:
acquiring information associated with a first device's receiving of a reference signal transmitted by at least one signal source on at least one reference position of a second device, the at least one reference position being determined at least according to information associated with a relative position desired between the first device and the second device; and
prompting adjusting the relative position between the first device and the second device at least according to the information associated with the first device's receiving of the reference signal transmitted on the at least one reference position.

23. The method of claim 22, wherein the method further comprises:
controlling the at least one signal source to transmit the reference signal on the at least one reference position of the second device at least according to the information associated with the relative position desired between the first device and the second device.

24. The method of claim 23, wherein the method further comprises:
acquiring the information associated with the relative position desired between the first device and the second device; and
determining the at least one reference position at least according to the information associated with the relative position desired between the first device and the second device.

25. The method of claim 22, wherein the information associated with the relative position desired between the first device and the second device comprises at least one of the following:
a distance desired between the first device and the second device, and a relative orientation desired between the first device and the second device.

26. The method of claim 22, wherein the acquiring information associated with a first device's receiving of a reference signal transmitted by at least one signal source on at least one reference position of a second device comprises:
receiving the information associated with the first device's receiving of the reference signal transmitted by the at least one signal source on the at least one reference position of the second device.

27. The method of claim 22, wherein the information associated with the first device's receiving of the reference signal transmitted by the at least one signal source on the at least one reference position of the second device comprises at least one of the following:
whether the first device has received the reference signal transmitted on the at least one reference position, strength of the reference signal, which the first device has received, transmitted on the at least one reference position, and a strength difference between at least two reference signals, which the first device has received, transmitted on the at least one reference position.

28. The method of claim 22, wherein the prompting adjust the relative position between the first device and the second device comprises:
prompting adjusting current position of at least one of the first device and the second device.

29. The method of claim 28, wherein the method further comprises:
acquiring information associated with an adjustment rule of the relative position; and
in the prompting adjusting current position of at least one of the first device and the second device, prompting adjusting the current position of at least one of the first device and the second device at least according to the information associated with the adjustment rule of the relative position.

30. The method of claim 29, wherein the reference signal transmitted on the at least one reference position comprises the information associated with the adjustment rule of the relative position.

31. The method of claim 22, wherein the reference signal comprises:
a visible light signal.

32. An apparatus for adjusting relative positions between devices, wherein the apparatus comprises:
a first acquisition module, configured to acquire information associated with a first device's receiving of a reference signal transmitted by at least one signal source on at least one reference position of a second device, the at least one reference position being determined at least according to information associated with a relative position desired between the first device and the second device; and
a first determination module, configured to determine information associated with adjustment on the relative position between the first device and the second device at least according to the information associated with the first device's receiving of the reference signal transmitted on the at least one reference position.

33. The apparatus of claim 32, wherein the apparatus further comprises:
a first control module, configured to control the at least one signal source to transmit the reference signal on the at least one reference position of the second device at least according to the information associated with the relative position desired between the first device and the second device.

34. The apparatus of claim 33, wherein the apparatus further comprises:
a second acquisition module, configured to acquire the information associated with the relative position desired between the first device and the second device; and
a second determination module, configured to determine the at least one reference position at least according to the information associated with the relative position desired between the first device and the second device.

35. The apparatus of claim 32, wherein the apparatus further comprises:
a first sending module, configured to send information associated with an adjustment rule of the relative position.

36. The apparatus of claim 32, wherein the first acquisition module comprises:
a first receiving unit, configured to receive the information associated with the first device's receiving of the reference signal transmitted by the at least one signal source on the at least one reference position of the second device.

37. The apparatus of claim 32, wherein the apparatus further comprises:
a first generation module, configured to generate a control command that controls at least one of the first device and the second device to adjust a current position at least according to the information associated with adjustment on the relative position between the first device and the second device; and
a second sending module, configured to send the control command.

38. The apparatus of claim 32, wherein the apparatus further comprises:
a second generation module, configured to generate prompt information that prompts adjusting current position of at least one of the first device and the second device at least according to the information associated with adjustment on the relative position between the first device and the second device; and
a third sending module, configured to send the prompt information.

39. An apparatus for adjusting relative positions between devices, the apparatus comprising:
a third acquisition module, configured to acquire information associated with a first device's receiving of a reference signal transmitted by at least one signal source on at least one reference position of a second device, the at least one reference position being determined at least according to information associated with a relative position desired between the first device and the second device; and
an adjustment module, configured to adjust the relative position between the first device and the second device at least according to the information associated with the first device's receiving of the reference signal transmitted on the at least one reference position.

40. The apparatus of claim 39, wherein the apparatus further comprises:
a second control module, configure to control the at least one signal source to transmit the reference signal on the at least one reference position of the second device at least according to the information associated with the relative position desired between the first device and the second device.

41. The apparatus of claim 40, wherein the apparatus further comprises:
a fourth acquisition module, configured to acquire the information associated with the relative position desired between the first device and the second device; and
a third determination module, configured to determine the at least one reference position at least according to the information associated with the relative position desired between the first device and the second device.

42. The apparatus of claim 39, wherein the third acquisition module comprises:

a second receiving unit, configured to receive the information associated with the first device's receiving of the reference signal transmitted by the at least one signal source on the at least one reference position of the second device.

43. The apparatus of claim 39, wherein the adjustment module is configured to adjust current position of at least one of the first device and the second device.

44. The apparatus of claim 43, wherein the apparatus further comprises:
a fifth acquisition module, configured to acquire information associated with an adjustment rule of the relative position; and
the adjustment module is configured to adjust the current position of at least one of the first device and the second device at least according to the information associated with the adjustment rule of the relative position.

45. An apparatus for adjusting relative positions between devices, the apparatus comprising:
a sixth acquisition module, configured to acquire information associated with a first device's receiving of a reference signal transmitted by at least one signal source on at least one reference position of a second device, the at least one reference position being determined at least according to information associated with a relative position desired between the first device and the second device; and
a prompt module, configured to prompt adjusting the relative position between the first device and the second device at least according to the information associated with the first device's receiving of the reference signal transmitted on the at least one reference position.

46. The apparatus of claim 45, wherein the apparatus further comprises:
a third control module, configured to control the at least one signal source to transmit the reference signal on the at least one reference position of the second device at least according to the information associated with the relative position desired between the first device and the second device.

47. The apparatus of claim 46, wherein the apparatus further comprises:
a seventh acquisition module, configured to acquire the information associated with the relative position desired between the first device and the second device; and
a fourth determination module, configured to determine the at least one reference position at least according to the information associated with the relative position desired between the first device and the second device.

48. The apparatus of claim 45, wherein the sixth acquisition module comprises:
a third receiving unit, configured to receive the information associated with the first device's receiving of the reference signal transmitted by the at least one signal source on the at least one reference position of the second device.

49. The apparatus of claim 45, wherein the prompt module is configured to prompt adjusting current position of at least one of the first device and the second device.

50. The apparatus of claim 49, wherein the apparatus further comprises:
an eighth acquisition module, configured to acquire information associated with an adjustment rule of the relative position; and
the prompt module is configured to prompt adjusting the current position of at least one of the first device and the second device at least according to the information associated with the adjustment rule of the relative position.

51. A computer readable non-transitory storage device, comprising at least one executable instruction, which, in response to execution, causes a system comprising a processor to perform operations, comprising:
acquiring information associated with a first device's receiving of a reference signal transmitted by at least one signal source on at least one reference position of a second device, the at least one reference position being determined at least according to information associated with a relative position desired between the first device and the second device; and
determining information associated with adjustment on the relative position between the first device and the second device at least according to the information associated with the first device's receiving of the reference signal transmitted on the at least one reference position.

52. A device for adjusting relative positions between devices comprising a processor and non-transitory memory, the memory storing computer executable instructions, the processor being connected with the memory via a communication bus, and when the device is operating, the processor executes or facilitates execution of the executable instructions stored by the memory to perform:
acquiring information associated with a first device's receiving of a reference signal transmitted by at least one signal source on at least one reference position of a second device, the at least one reference position being determined at least according to information associated with a relative position desired between the first device and the second device; and
determining information associated with adjustment on the relative position between the first device and the second device at least according to the information associated with the first device's receiving of the reference signal transmitted on the at least one reference position.

53. A computer readable non-transitory storage device, comprising at least one executable instruction, which, in response to execution by a processor, causes a system comprising the processor to perform operations, comprising:
acquiring information associated with a first device's receiving of a reference signal transmitted by at least one signal source on at least one reference position of a second device, the at least one reference position being determined at least according to information associated with a relative position desired between the first device and the second device; and
adjusting the relative position between the first device and the second device at least according to the information associated with the first device's receiving of the reference signal transmitted on the at least one reference position.

54. A device for adjusting relative positions between devices comprising a processor and non-transitory memory, the memory storing computer executable instructions, the processor being connected with the memory via a communication bus, and when the device is operating, the processor executes or facilitates execution of the computer executable instructions stored by the memory to perform:
acquiring information associated with a first device's receiving of a reference signal transmitted by at least one signal source on at least one reference position of a second device, the at least one reference position being determined at least according to information associated with a relative position desired between the first device and the second device; and
adjusting the relative position between the first device and the second device at least according to the information associated with the first device's receiving of the reference signal transmitted on the at least one reference position.

55. A computer readable non-transitory storage device, comprising at least one executable instruction, which, in response to execution by a processor, causes a system comprising the processor to perform operations, comprising:
acquiring information associated with a first device's receiving of a reference signal transmitted by at least one signal source on at least one reference position of a second device, the at least one reference position being determined at least according to information associated with a relative position desired between the first device and the second device; and
prompting to adjust the relative position between the first device and the second device at least according to the information associated with the first device's receiving of the reference signal transmitted on the at least one reference position.

56. A device for adjusting relative positions between devices comprising a processor and non-transitory memory, the memory storing computer executable instructions, the processor being connected with the memory via a communication bus, and when the device is operating, the processor executes or facilitates execution of the computer executable instructions stored by the memory to perform:
acquiring information associated with a first device's receiving of a reference signal transmitted by at least one signal source on at least one reference position of a second device, the at least one reference position being determined at least according to information associated with a relative position desired between the first device and the second device; and
prompting to adjust the relative position between the first device and the second device at least according to the information associated with the first device's receiving of the reference signal transmitted on the at least one reference position.

* * * * *